A. Y. HUBBELL.
Vehicle-Seat.
No. 208,820.             Patented Oct. 8, 1878.
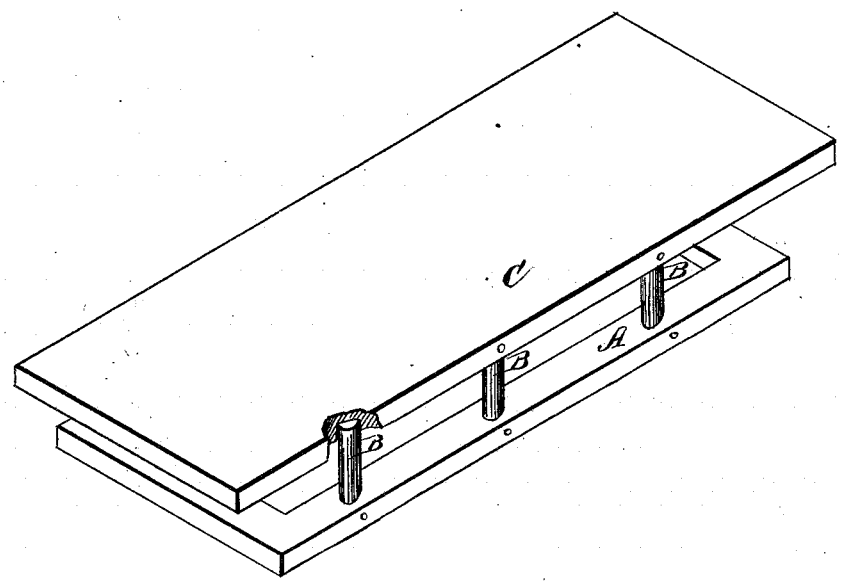

UNITED STATES PATENT OFFICE.

ARTHUR Y. HUBBELL, OF NEW YORK, N. Y.

IMPROVEMENT IN VEHICLE-SEATS.

Specification forming part of Letters Patent No. 208,820, dated October 8, 1878; application filed March 19, 1878.

*To all whom it may concern:*

Be it known that I, ARTHUR Y. HUBBELL, of New York, in the county of New York and State of New York, have invented certain new and useful Improvements in Spring-Seats; and I do hereby declare that the following is a full, clear, and exact description thereof, reference being had to the accompanying drawing, and to the letters of reference marked thereon, which form part of this specification.

The nature of my invention consists in the construction of a seat for vehicles, mowing and other machines, as will be hereinafter more fully set forth.

In order to enable others skilled in the art to which my invention appertains to make and use the same, I will now proceed to describe its construction and operation, referring to the annexed drawing, in which the figure is a perspective view of my seat.

A represents a stationary frame, of any suitable dimensions, secured upon the wagon-box or machine in any suitable manner. In this frame is made a series of holes for the insertion of a series of rubber blocks, B B, which are held in said holes by pins or any other convenient or suitable means. These blocks project above the frame any desired distance, and their upper ends are inserted and fastened in recesses made in the under side of the seat C, as shown.

The advantages of this construction are, that the seat has but a very little vertical motion, but has a lateral movement; it rests entirely on rubber supports, which also hold the seat in its place, so that the seat is entirely insulated from the vehicle by rubber, and no jar can be transmitted to the seat.

Its advantage is not in the amount of spring or movement of the rubber, but its capacity to absorb a blow and prevent any jar from passing it. The seat rests upon the rubber in such a way that it has a slight movement in every direction, and yet the rubber holds it in place without any other connection to the stationary part of the carriage. This may also be used for the seat back and sides, and for the bottom on which the feet rest.

I am aware that a seat supported upon flexibly-jointed levers, and having hollow rubber springs interposed between the seat and levers, is not new, and I do not claim such as my invention.

Having thus fully described my invention, what I claim as new, and desire to secure by Letters Patent, is—

The combination of a rigid and stationary supporting-frame, A, a seat, C, and interposed rubber blocks B, substantially as described, whereby the seat obtains a lateral as well as perpendicular movement by the action of the rubber blocks, as set forth.

In testimony that I claim the foregoing as my own I affix my signature in presence of two witnesses.

ARTHUR Y. HUBBELL.

Witnesses:
   THOS. FRAZIER,
   ALBERT FRAZIER.